United States Patent [19]

DeRoeck et al.

[11] Patent Number: 5,244,576
[45] Date of Patent: Sep. 14, 1993

[54] SPENT CAUSTIC TREATMENT

[75] Inventors: Robert L. DeRoeck, Washington, N.H.; Allan R. Huntley, Northwood, England

[73] Assignee: Stone & Webster Engineering Limited, Buckinghamshire, England

[21] Appl. No.: 831,242

[22] Filed: Feb. 4, 1992

[30] Foreign Application Priority Data

Feb. 5, 1991 [GB] United Kingdom ............... 9102403

[51] Int. Cl.⁵ .......................................... B01D 11/04
[52] U.S. Cl. ................................... 210/638; 210/761
[58] Field of Search ............... 210/634, 638, 758, 759, 210/760, 761, 762, 208; 208/235

[56] References Cited

U.S. PATENT DOCUMENTS

| | | | |
|---|---|---|---|
| 3,761,409 | 9/1973 | McCoy et al. | 210/63 |
| 3,963,611 | 6/1976 | Dardenne-Ankringa, Jr. | 210/63 |
| 4,179,365 | 12/1979 | Sumi | 210/610 |
| 4,347,144 | 8/1982 | Bodenbenner et al. | 210/761 |
| 4,372,940 | 2/1983 | Brandenburg et al. | 423/567 |
| 4,417,986 | 11/1983 | Connaught et al. | 210/759 |
| 4,584,107 | 4/1986 | Odaka et al. | 210/760 |
| 4,666,689 | 5/1987 | Maple et al. | 208/235 X |
| 4,746,434 | 5/1988 | Grieves et al. | 210/610 |
| 4,793,931 | 12/1988 | Stevens et al. | 210/636 |
| 4,948,511 | 8/1990 | Swanson et al. | 210/634 |

FOREIGN PATENT DOCUMENTS

| | | |
|---|---|---|
| 313489 | 4/1989 | European Pat. Off. |
| 669091 | 3/1952 | United Kingdom . |
| 812648 | 4/1959 | United Kingdom . |

OTHER PUBLICATIONS

Chen et al., "Spent Caustic Treatment and Disposal" Proceedings of the 42nd Industrial Waste Conference May 1987.
Sitting, M. "Petroleum Refinery Industry", Energy Saving and Environmental Control ®1978.
A. G. Smith, "Ridding Process Waters and Caustic Solutions of Sulphides", Oil and Gas Journal, Jul. 9, 1956 pp. 95-99.
J. D. Martin and L.D. Levanus, "New Column Removes Sulfide with Air", Hydrocarbon Processing and Petroleum Refiner, 41 May 1962, pp. 149-153.
Otto Abegg, "A Plant for the Oxidation of Sulphide-Containing Refinery Wastes by Air", Erdol and Kohl, Erdgas, Petrochemie vol. 14 No. 8, pp. 621-626 (1961).
Otto Abegg, "A Plant for the Oxidation of Sulphide-Containing Refinery Wastes by Air", Erdol and Kohl, Erdgas, Petrochemie vol. 15, No. 9, pp. 721-722 (1962).

Primary Examiner—Frank Spear
Attorney, Agent, or Firm—Hedman, Gibson & Costigan

[57] ABSTRACT

A process is provided for treating a sulfide-containing alkaline aqueous effluent to improve its environmental acceptability, which comprises: (a) intimately mixing a water-immiscible solvent, such as a pyrolysis gasoline, therewith for a sufficient time to extract polymerizable hydrocarbon compounds and/or other compounds which may cause fouling of downstream plant, (b) allowing the solvent phase and the aqueous phase to separate, (c) removing the solvent phase, and (d) subjecting the separated aqueous phase to an oxidation treatment which oxidizes sulfide ions to environmentally acceptable sulfur acid ions, particularly sulfate ions, e.g. a wet air oxidation process. The invention has been particularly developed for treating spent caustic which has been used to scrub gases produced by cracking for ethylene production. Such effluents have been found to cause fouling of the oxidation plant and the Applicants have found that this is due to polymerizable hydrocarbons. Furthermore they have found that prolonged contact times between a readily available solvent and the effluent can ensure that the fouling problem is cured.

25 Claims, 6 Drawing Sheets

SPENT CAUSTIC TREATMENT

FIELD OF THE INVENTION

This invention relates primarily to the treatment of alkaline solutions which have been used in industrial processes (effluents) so that the solutions may be disposed of with less detriment to the environment, in particular so that the chemical oxygen demand (COD) of the effluent is reduced. The invention is particularly applicable to aqueous alkaline solutions which contain sulfide ion and polymerisable olefinically (or acetylenically) unsaturated compounds, particularly hydrocarbons and more especially the more readily polymerisable compounds such as diolefins (butadiene etc.).

BACKGROUND OF THE INVENTION

It has been conventional in the petrochemical industry to scrub gases produced by cracking for ethylene production (or by other hydrocarbon conversion processes), with aqueous sodium hydroxide solution. Such a scrubbing treatment removes hydrogen sulfide and carbon dioxide as sodium sulfide, sodium carbonate and sodium bicarbonate and also removes some of the higher molecular weight hydrocarbon constituents carried by the cracked gas stream. Discharge of such effluent would be environmentally harmful and at the very least neutralisation is necessary. However, neutralisation involves regeneration of carbon dioxide and some of the hydrogen sulfide but still leaves a substantial content of hydrogen sulfide and sulfide ions which have a high COD. Processes have therefore been developed to oxidise the sulfide (and other inorganic sulfur acid salts) in the alkaline solution to at least thiosulfate ion and generally to the more environmentally acceptable sulfate ion. Such oxidation processes are generally Wet Air Oxidation (WAO) processes in which gaseous oxygen in the form of fine bubbles is contacted with spent caustic in contacting columns for relatively long periods. The basic WAO process has been known for many years. Such a process which oxidises to thiosulfate is described in Smith, A. G., "Ridding Process Waters and Caustic Solutions of Sulphides", Oil and Gas J, Jul. 9, 1956, p. 95-99. Two articles by Otto Abegg in the publication Erdol und Kohle, Erdgas, Petrochemie (1) Vol. 14, No. 8, p 621-626 (1961) and (2) Vol. 15, No. 9, p 721-722 (1962) describe experiments aimed at complete conversion of sulfide to sulfate in the WAO process. Other descriptions of WAO processes are included for example in Martin, J. D. and Levanas, L. D., "New Column Removes Sulfide with Air", Hydrocarbon Processing & Petroleum Refiner, 41, May 1962, p. 149-153 and in U.S. Pat. No. 3,963,611 assigned to Chevron Research Company and U.S. Pat. No. 3,761,409 assigned to Texaco Inc. Various process variables are described such as temperature, pressure and steam injection as well as gas/liquid contacting devices and co-current and counter-current arrangements with and without catalysts.

Chemical Reagent Oxidation (CRO) of sulfide-containing effluent has also been proposed. For example, U.S. Pat. No. 4,417,986 assigned to Mobil Oil Corporation proposes the use of hydrogen peroxide and U.S. Pat. No. 4,584,107 assigned to Sumitomo Metal Mining Company Limited proposes the use of ozone.

One of the problems which has been encountered with such oxidation treatments and with WAO treatments in particular is the formation of polymeric material which tends to clog lines, contacting towers, valves, etc. and it is postulated that the oxygen used in the oxidation induces polymerisation of at least the more readily polymerisable hydrocarbons carried over with the spent caustic, the oxidation being the first stage at which oxygen is permitted to contact the effluent. The amount of hydrocarbon material is generally small but even if it is large enough to be decanted from the surface of the effluent a certain amount will remain dispersed in the aqueous phase.

SUMMARY OF THE INVENTION

The present invention provides a process for removing polymerisable hydrocarbon compounds and/or other compounds which may cause fouling of downstream plant, from a sulfide-containing alkaline aqueous effluent (or other environmentally unacceptable aqueous material which would benefit from such treatment) to facilitate subsequent oxidation or other treatment which would be adversely affected by polymer fouling, which comprises intimately mixing a water-immiscible solvent therewith for a sufficient time to extract such compounds, allowing the solvent phase and the aqueous to separate and removing the solvent phase.

Surprisingly, it has been found that the contact time of the two liquids is significant in achieving the desired result of preventing or reducing fouling of downstream plant used for oxidation, neutralisation and disposal of the effluent. For example a contact time of 1 minute is not normally satisfactory, the preferred contact time (with intimate mixing) being at least 10 minutes with at least 20 minutes being particularly preferred. These contact time figures are derived from laboratory experiments carried out in a batchwise manner; as is well known in this art, the corresponding contact time for continuously flowing liquids has to be considerably increased to obtain the same effect. For example, a 10 minutes contact time in the laboratory batchwise experiment might correspond to a 15 minutes contact time under continuous flow in an efficient contacting device. Without wishing to be bound by theory, we believe that the long residence time is effective because of the presence of partial polymers in solid form even at that early stage in the process.

It has also been found that satisfactory extraction of the polymerisable compounds can be achieved using a relatively low volume of solvent make-up, the solvent being cycled through a container containing the effluent preferably with a residence time as indicated above for the caustic phase. For example a volume ratio of make-up solvent to effluent of 1 to 100 may be used though possible ratios could for example be extended to 1 to 10. A similar volume of solvent will be withdrawn for solvent recovery, both the solvent addition and solvent withdrawal being preferably substantially continuous.

The solvent recycling rate to the contacting container may be e.g. from 0.5 times to 4 times the aqueous effluent rate, particularly 10 times to 4 times and preferably 1.5 times to 4 times the aqueous effluent rate.

In one embodiment of the invention, agitation is achieved in the contacting container by the force of recycled solvent pumped into the mixture therein i.e. a form of hydraulic agitation (the amount of new, as opposed to recycled, solvent will generally be small). One such arrangement involves the use of jet mixers or spray nozzles (in which the solvent injection jets discharge into venturis to multiply (e.g. 3×) the flow of the ambient liquid) though ordinary jets could be used. However, care must be taken to avoid a degree of turbulence which leads to emulsification of the solvent in the aqueous effluent. In another embodiment, a mechanical stirrer or other agitator is used, in such a manner as to provide thorough mixing for the required time in intimate contact. A subdivided container which provides a plurality of mixing stages in series may be used or a plurality of divided or undivided containers in series can be employed, optionally with an upstream static mixer. A static mixer is a mixer which has no moving parts and which deflects the liquid flow to cause mixing. Rigid guiding elements or baffles split the flow into streams, reunite them and split them in a different way.

In a further embodiment, a series of static mixer units effects the whole mixing. Thus the mixture is passed in turbulent flow through a pipe of sufficient length and residence time, which is substantially filled with static mixer elements. These stationary elements increase the turbulence, and subdivide and re-direct the flow many times per meter.

Combinations of these and other mixing methods can be employed.

It has furthermore been found that intimate mixing is improved by pulsing which is effected by rapid cyclical fluid displacements. Preferably pulsing is effected by an oscillating diaphragm or piston.

In another arrangement, mixing is effected, at least in part, by agitation caused by ultrasonic energy, in one chamber or in a plurality of chambers connected in series.

The solvent will normally be a gasoline of the type readily available in an ethylene plant e.g. $C_6/400°$ F. or $C_9/400°$ F. pyrolysis gasoline which has desirably been hydrotreated to hydrogenate the more reactive diene species to monolefins (such hydrotreatment is conventional for pyrolysis gasolines). More generally the preferred solvent could be described as a hydrocarbon solvent rich in aromatics and olefins but low in diolefins and having a typical boiling range of 200°–200° F. However a variety of single or mixed aromatic hydrocarbon solvents can be used.

A laboratory shaker test was carried out using a heavy gasoline of the following composition:

| Component | Wt % |
| --- | --- |
| $C_6$–$C_8$ Non-aromatics | 17.1 |
| Benzene | 3.3 |
| Toluene | 2.3 |
| Xylene/EB/Styrene | 25.3 |
| $C_9$ - 400° F. ABP | 51.7 | and a spent caustic containing 121.8 mg/100 ml of gum material. The tests were carried out at room temperature with mild agitation. Various contact times and solvents were used to determine extraction efficiency and the following results were obtained:

| Contact Time | Extraction Efficiency % | |
| --- | --- | --- |
| (min) | Raw Gasoline | Heavy Gasoline |
| 1 | 79.9 | 85.6 |
| 2 | 80.3 | 85.4 |
| 5 | 88.4 | 90.7 |
| 10 | 91.1 | 96.3 |

Examples of effluents to be treated respectively contain the following percentage of the indicated compounds:

| | 1 | 2 | 3 |
| --- | --- | --- | --- |
| $Na_2S$ | 0.9 | 1–1.5 | 0.5–2.0 |
| NaOH | 1.0 | 0.7 | 3–5 |
| $Na_2CO_3$ | 9.5 | 0.5–1.0 | 2.5–4 |

The amounts of these compounds depend e.g. on the amount of carbon dioxide and hydrogen sulfide in the cracked gas being scrubbed and the effluents have a pH of 10–13 (maintained by the sodium carbonate as well as residual sodium hydroxide).

In one possible arrangement the pressure of effluent received from the scrubbing towers will determine the pressure of the process down to the point where solvent and effluent are removed from the extraction system and might for example be 250 psi. However, a wide range of pressures may be used for the extraction system depending on normal design factors (e.g. to avoid bubble formation in either phase). The solvent recycle pump should generate a higher pressure e.g. at least 5–10 psi higher. The relatively small amount of new solvent can be injected into the line supplying the effluent to the extraction container.

The invention also provides apparatus for removing polymerisable hydrocarbon compounds and/or other compounds which may cause fouling of downstream plant, from a sulfide-containing alkaline aqueous effluent, comprising means for intimately mixing the effluent with a water-immiscible solvent, a downstream container providing gravity separation means for separating the solvent and the effluent, and pump means for recycling at least a major proportion of solvent so separated to the solvent introduction means, means being provided for adding fresh solvent to the recycle system and for withdrawing it therefrom e.g. for regeneration.

BRIEF DESCRIPTION OF THE DRAWINGS

Embodiments of the invention are shown by way of example in the accompanying drawings in which.

DESCRIPTION OF THE DRAWINGS

Figure 1:
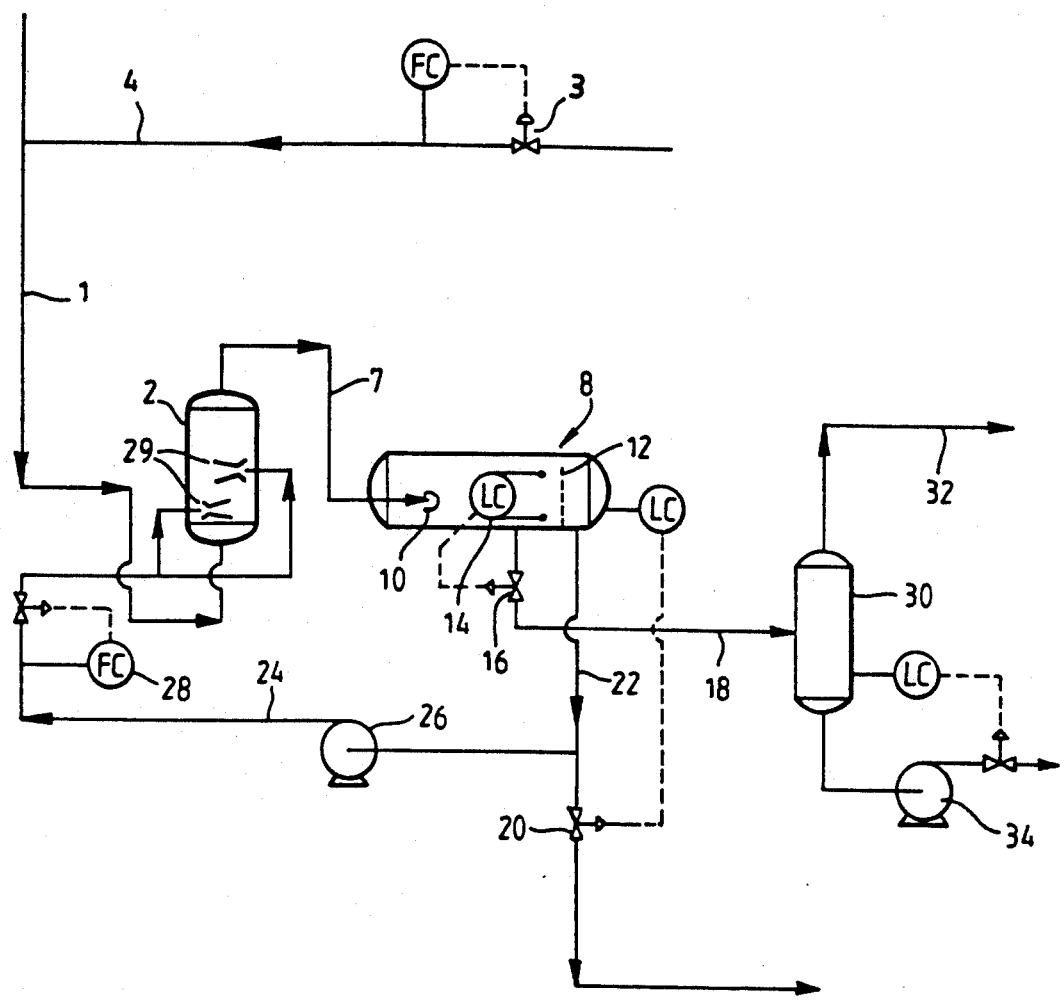
FIG. 1 shows diagrammatically one apparatus for carrying out the invention.

Referring to FIG. 1, line 1 is a supply line for spent caustic from an ethylene plant which leads to the base of a mixing drum 2, the volume of which is determined by the total rate of caustic feed and gasoline feed and the desired residence time. Fresh gasoline is injected into the line 1 via flow control valve 3 and a line 4. A line 7 connects the top of the mixing drum to a de-oiling or gravity-separation drum 8 via a port 10. The drum 8 is in itself conventional and has a weir 12 over which the gasoline phase flows. A level control 14 in the drum 8 itself (or alternatively in a vertical side standpipe connected thereto at levels within the respective phase regions) comprises a float arranged to have a density such that it remains at the liquid interface and controls a valve 16 in line 18 through which caustic is withdrawn so that the interface is well below the top of the weir 12. Another level control in the gasoline chamber on the other side of the weir adjusts a valve 20 in a line 22 through which part of the gasoline is withdrawn from the system for recovery. The main flow of gasoline passes through line 24 via a pump 26 and flow controller 28 and thence to mixer jets 29 of the venturi type through which it is injected into the caustic in the drum 2 (two are shown but less or more e.g. one or four could be used). Line 18 takes withdrawn caustic to a degassing drum 30, the gases being withdrawn therefrom for incineration through line 32 and the caustic being pumped out by pump 34.

Figure 2:
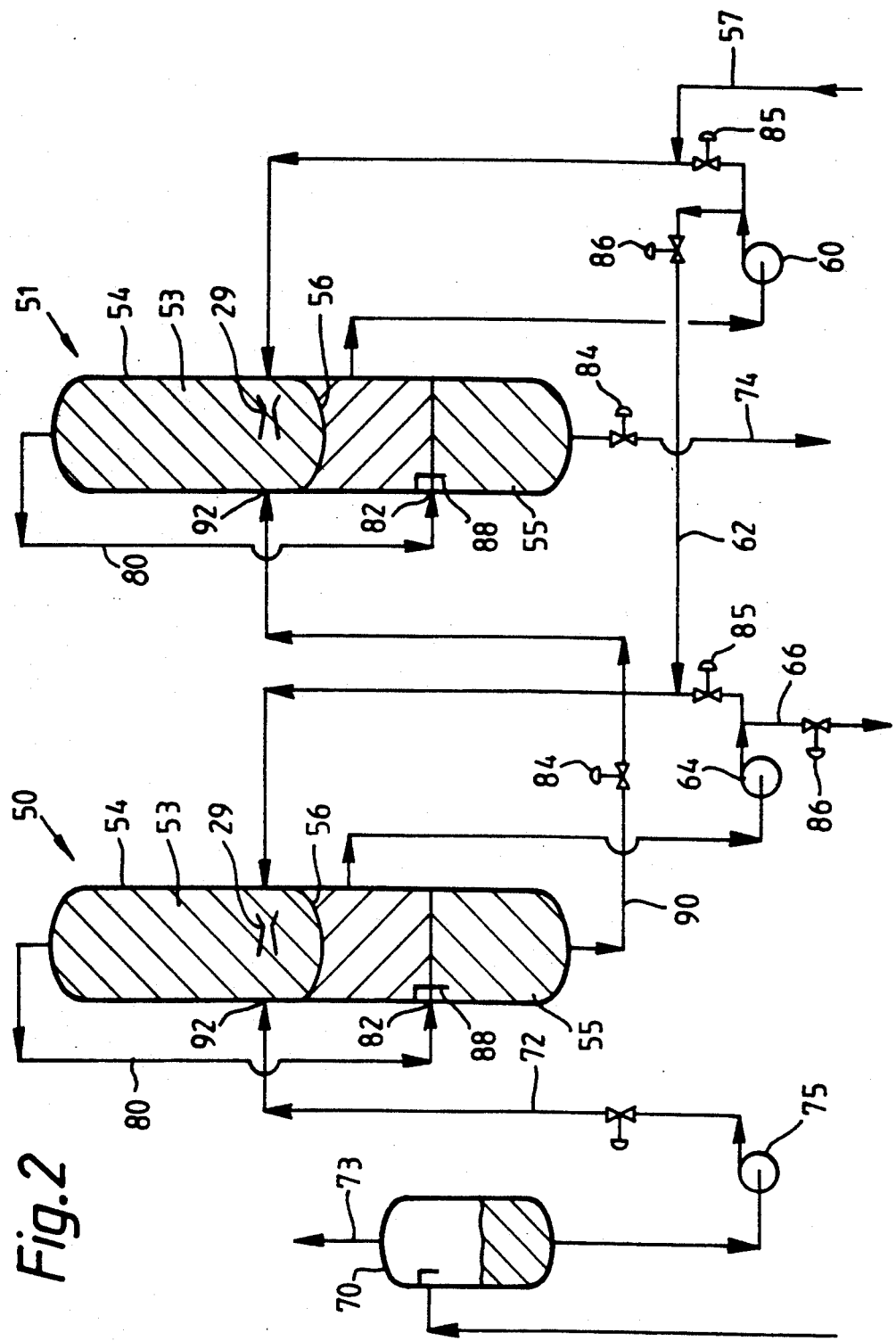
FIG. 2 shows a modified apparatus.

In the FIG. 2 arrangement, the spent caustic passes consecutively through two mixing and separation stages 50, 51, each of which comprises a combined vertical mixing and separating drum 54 having an internal dividing wall 56 providing an upper mixing chamber 53 corresponding to the drum 2 of FIG. 1 and a lower separating chamber 55 corresponding to the drum 8 of FIG. 1. Make-up gasoline is supplied to a recycle circuit of stage 51 through line 57, the recycling through stage 51 being effected by pump 60. The net outflow is released to the recycle circuit of stage 50 through line 62. The recycle circuit of stage 50 is driven by pump 64 and provision is made to withdraw the net gasoline outflow therefrom through line 66. Spent caustic is supplied to the drum 54 of the first stage 50 via drum 70 (which separates gas via line 73), pump 75 and line 72 and leaves the second stage 51 via line 74. The spent caustic thus passes through the first stage 50 and then the second stage 51 whereas the net flow of gasoline is through second stage 51 and then first stage 50.

Each drum 54 has a line 80 which connects the upper end of mixing chamber 53 with a side wall port 82 in the corresponding separating chamber 55. The valve 84 which controls the amount of spent caustic leaving the separating chamber 55 is adjusted by a level controller (not shown) similar to that used in the FIG. 1 arrangement, to maintain the interface between the two phases at approximately the level of the port 82, a baffle 88 being provided to deflect the incoming flow so as to minimise disturbance of the interface. Valve 86 must release a volume of gasoline equal to the gasoline make-up and valve 85 controls the main recycle flow. A line 90 connects the lower end of the first stage drum 54 to the inlet port 92 in the side wall of the mixing chamber 53 of the second stage 51 via the valve 84 of the first stage 50. One or more mixer jets 29 are provided for supplying gasoline to the mixing chambers 53 as in the FIG. 1 arrangement; again four or more can be used in each chamber 53.

Figure 3:
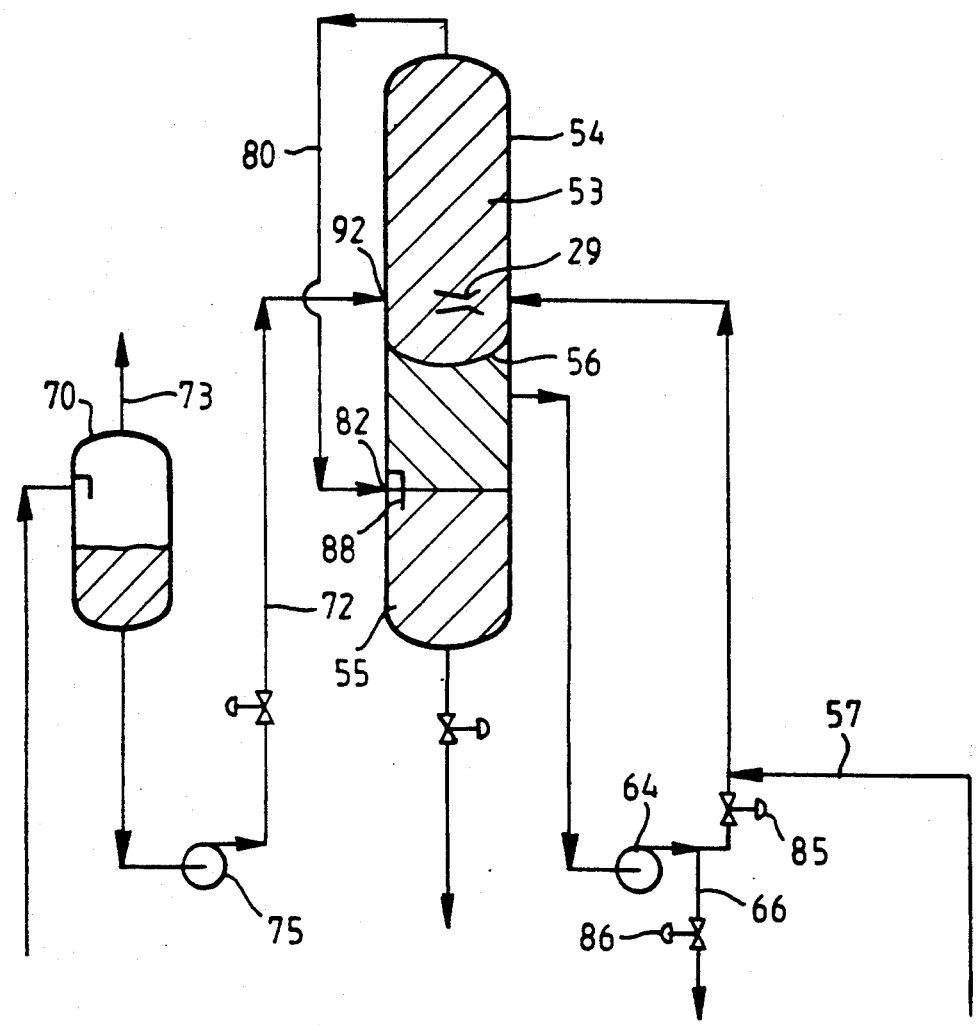
FIG. 3 shows a single stage variant of the apparatus of FIG. 2.

In the FIG. 3 arrangement, only one stage is used but otherwise the parts and operation are the same and the same reference numerals are used to designate similar parts.

Figure 4:
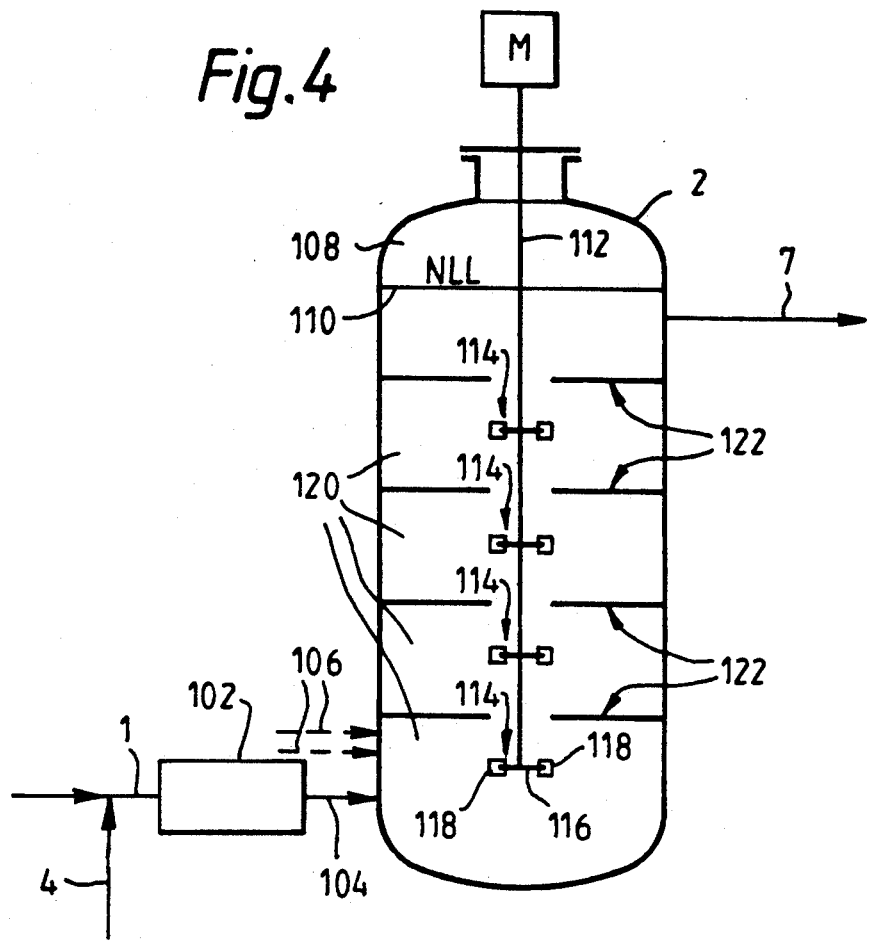
FIG. 4 shows an alternative mixing drum in cross-section.

Referring now to FIG. 4, this shows an alternative form of the mixing drum 2 which can replace the mixing drum 2 of FIG. 1 (or with appropriate modification the mixing drums of FIGS. 2 and 3). As in the FIG. 1 arrangement, spent caustic is supplied through line 1 and gasoline is injected through line 4. However, in the FIG. 4 arrangement, this gasoline consists not only of new gasoline supplied to the system but also recycled gasoline such as is supplied through line 24 in FIG. 1. Depending on the volume flow ratios it may be desirable to inject the caustic into the gasoline flow by a central axially disposed nozzle (not shown) in the line 1. The mixture then desirably passes to a static mixer assembly 102. The elements within the short static mixer are as described above and may be of the type sold by Sulzer.

Figure 5:
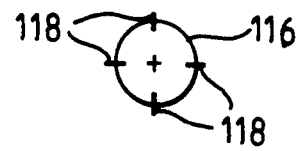
FIG. 5 shows, in plan view, an impeller used in the FIG. 5 mixing drum.

The mixing drum 2 of FIGS. 4 and 5 is therefore used with a static mixer 102 being an efficient way of obtaining an initial degree of mixing. The vertical drum 2 has an inlet line 104 leading from the static mixer 102 but it would be possible as an alternative to omit the mixer 102 and simply feed the caustic and the gasoline directly into the drum 2 via separate lines as shown at 106. Normally the mixture is fed into the bottom of the drum 2 and leaves at the top, e.g. by a line 7. In this case there is an air space 108 above the normal liquid level 110. A central shaft 112 enters the top of the drum 2 through a seal and carries a plurality of impellers 114, four being shown by way of example. These impellers 114 may comprise discs 116 with plates 118 welded to their periphery as will be clear from FIGS. 4 and 5. Each impeller 114 is located in a respective sub-chamber 120 formed by dividing the drum 2 by a number of horizontal annular baffles 122, these baffles 122 being intended to minimize the likelihood of any caustic passing through without adequate solvent-contacting. The central openings in the baffles 122 should, as a practical matter, be sufficient to allow withdrawal of the shaft 112 and the impellers 114 for servicing. Additional vertical baffles (not shown) may be used to increase the mixing efficiency. An electric motor M with suitable conventional reduction gearing serves to drive the shaft 112 e.g. at 100 to 200 rpm.

Figure 6:
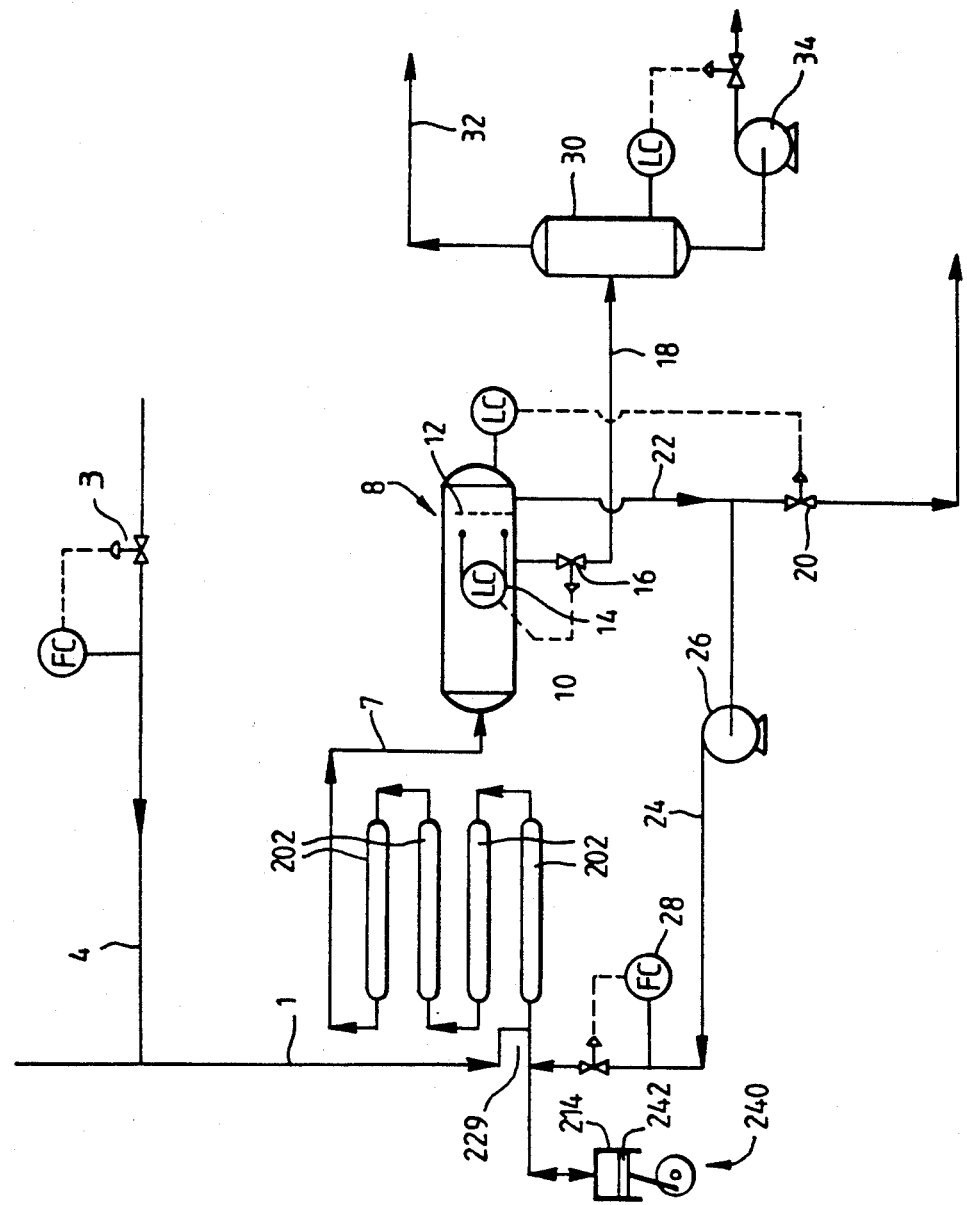
FIG. 6 shows a modification of FIG. 1 which uses static mixer units.

FIG. 6 shows a modification of the FIG. 1 arrangement in which a plurality of series-connected static mixer assemblies 202 (longer than the static mixer assembly 102 of FIG. 4) replace mixing drum 2. The gasoline line 24 feeds the gasoline to the inlet 229 of the first assembly 202 where it is joined by spent caustic entering through line 1. A pulsing unit 240 is shown diagrammatically in line 24 and comprises a cylinder 241 in which a sealed piston 242 reciprocates, at say 100 to 300 cycles per minute, drawing in and expelling gasoline from line 24. Otherwise like parts are given the same reference numerals and further description is unnecessary.

Typical approximate relative flow rates (for all the illustrated embodiments of the invention) are as follows:

| | |
|---|---|
| Spent caustic feed | 100 |
| Spent caustic withdrawal | 100 |
| Circulated gasoline | 100–400, preferably 100–150 |
| Fresh gasoline make-up | 1.0–10, preferably 1.5–6 |
| Gasoline withdrawal | 1.0–10, preferably 1.5–6 |

Typical approximate hold-up (residence) times are as follows:

| | |
|---|---|
| Spent caustic in mixing chamber | 25 mins |
| Spent caustic in separating chamber | 10–30 mins e.g. 12 mins. |

Although gravity separation is normally used in the invention, other conventional separation techniques (such as centrifuging) might be used under special circumstances.

Figure 7:
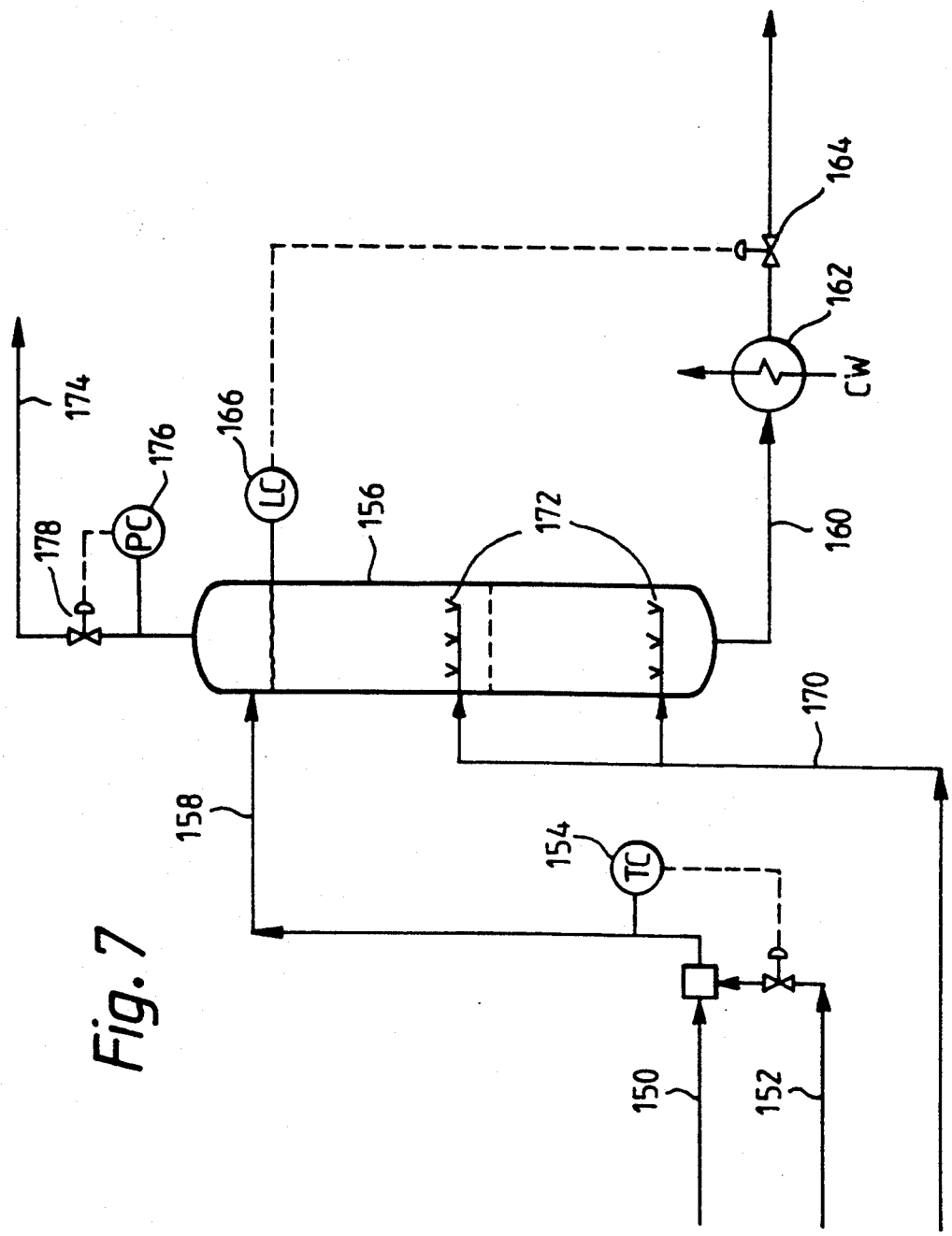
FIG. 7 shows diagrammatically a WAO plant.

The WAO plant of FIG. 7 is designed to receive caustic which has been solvent-treated according to the invention, particularly using the preferred solvent-treatment arrangements described above. However, the WAO process used is in itself conventional as will be apparent from the prior art acknowledged in this specification and it will thus only be described in general terms.

The solvent-treated caustic flowing in line 150 is injected with steam through line 152 using a temperature controller 154 and passes to the top of an oxidation reactor 156 via line 158. Treated caustic leaves the bottom of reactor 156 through line 160 and passes through water cooler 162 and valve 164, which is controlled by a level controller 166 responsive to the liquid level in the reactor 156, and thence to neutralisation and final discharge (not shown). Air is passed into the caustic in the reactor 156 via line 170 and rows of spargers 172 in a conventional manner. The steam injection raises the liquid temperature to about 100°-120° C. and the pressure of the air supplied to the reactor 156 is normally about 7 bar. Spent air and other gases and vapours are removed from the top of the reactor 156 by line 174 and are led away for incineration. A pressure controller 176 regulates a valve 178 in line 174.

A series of reactors 156, e.g. three, can be arranged in series if one is not sufficient to complete the oxidation in the illustrated arrangement.

It will be understood that the above description of the present invention is susceptible to various modifications, changes and adaptations and the same are intended to be comprehended within the meaning and range of equivalents of the appended claims.

What is claimed is:

1. A process for treating a sulfide ion-containing alkaline aqueous effluent to improve its environmental acceptability, which comprises:
   (a) intimately mixing a water-immiscible solvent therewith for at least ten minutes while said effluent and said solvent are in continuous flow in order to extract polymerisable hydrocarbon compounds which may cause fouling of downstream plant,
   (b) allowing the solvent phase and the aqueous phase to separate,
   (c) removing the solvent phase, and
   (d) subjecting the separated aqueous phase to a downstream oxidation treatment which oxidises sulfide ions to environmentally acceptable sulfur acid ions.

2. A process according to claim 1, wherein the mixing period is at least twenty minutes.

3. A process according to claim 1, wherein the intimate mixing is achieved, at least in part, by a static mixer.

4. A process according to claim 3, wherein intimate mixing is improved by pulsing which is effected by rapid cyclical fluid displacements.

5. A process according to claim 4, wherein pulsing is effected by an oscillating diaphragm or piston.

6. A process according to claim 1, wherein the intimate mixing is effected, at least in part, by hydraulic agitation in one chamber or in a plurality of chambers connected in series.

7. A process according to claim 6, wherein the hydraulic agitation is effected by jet mixers or spray nozzles.

8. A process according to claim 1, wherein the intimate mixing is achieved, at least in part, in a container subdivided by baffles into chambers, which chambers are connected in series and contain respective rotary impellers, in a plurality of such containers connected in series or in a plurality of containers connected in series which containers comprise a single chamber and a single impeller.

9. A process according to claim 1, wherein mixing is effected, at least in part, by agitation caused by ultrasonic energy, in one chamber or in a plurality of chambers connected in series.

10. A process according to claim 1, wherein the major part of the solvent is recycled to the mixing stage after the separation stage, make-up solvent being added to the recycle circuit or separately to the effluent at an earlier stage, and spent solvent being withdrawn from the recycle circuit.

11. A process according to claim 10, wherein the solvent flow rate during intimate mixing is 0.5 times to 4 times the effluent flow rate.

12. A process according to claim 1, wherein the phase separation is effected by gravity or centrifugal means.

13. A process according to claim 1, 2, 3, 6, 7, or 8 wherein the solvent is an aromatic hydrocarbon or mixture of aromatic hydrocarbons in the range of 80° to 200° C. boiling point.

14. A process according to claim 1, 2, 3, 6, 7 or 8 wherein the solvent is a hydrotreated pyrolysis gasoline.

15. A process according to claim 1, wherein the effluent is spent caustic which has been used to scrub gases produced by a hydrocarbon conversion process.

16. A process according to claim 15, wherein the gases have been produced by cracking for ethylene production.

17. A process according to claim 1, wherein the sulfide in the effluent is oxidised to sulfate ion.

18. A process for treating a sulfide ion-containing alkaline aqueous effluent which has been used to scrub gases produced by cracking for ethylene production, to improve its environmental acceptability, which comprises:
   (a) intimately mixing a water-immiscible solvent therewith for at least ten minutes while said effluent and said solvent are in continuous flow, in order to extract polymerisable hydrocarbon compounds which may cause fouling of downstream plant,
   (b) allowing the solvent phase and the aqueous phase to separate,
   (c) removing the solvent phase,
   (d) recycling the major part of the solvent phase to the mixing stage after the separation stage, make-up solvent being added to the recycle circuit or separately to the effluent at an earlier stage, and spent solvent being withdrawn from the recycle circuit, and
   (e) subjecting the separated aqueous phase to a downstream oxidation treatment which oxidises sulfide ions to sulfate ions.

19. A process according to claim 18, wherein the intimate mixing is achieved in a plurality of stages, a first stage being a static mixing stage and further stages being effected in chambers which are connected in series and which contain respective rotary impellers.

20. A process according to claim 18, wherein the intimate mixing is effected in a static mixer.

21. A process according to claim 20, wherein a cyclical pressure pulse is applied to the mixture during mixing.

22. A process according to claim 21, wherein the cyclical pressure pulse is achieved by an oscillating diaphragm or piston.

23. A process according to claim 18, wherein the solvent flow rate during intimate mixing is 0.5 times to 4 times the effluent flow rate.

24. A process according to claim 18, wherein the solvent is a hydrotreated pyrolysis gasoline.

25. A process for treating an environmentally unacceptable aqueous material, which comprises:
(a) intimately mixing a water-immiscible solvent therewith for at least ten minutes while said effluent and said solvent are in continuous flow, in order to extract compounds which may cause fouling of downstream plant,
(b) allowing the solvent phase and the aqueous phase to separate,
(c) removing the solvent phase, and
(d) subjecting the separated aqueous phase to a downstream oxidation treatment which would be adversely affected by polymer fouling.

* * * * *